United States Patent [19]
Erkens

[11] 3,766,005
[45] Oct. 16, 1973

[54] DEVICE FOR THE MECHANICAL SELECTION OF REACTOR MEASURING CANALS

[75] Inventor: Wilhelm Erkens, Neu Isenburg, Germany

[73] Assignee: Licentia Patent-Verwaltungs-G.m.b.H., Frankfurt, Germany

[22] Filed: May 19, 1971

[21] Appl. No.: 144,786

[30] Foreign Application Priority Data
May 22, 1970 Germany.................. P 20 24 992.7
May 22, 1970 Germany.................. P 70 19 080.6

[52] U.S. Cl.............................................. 176/19 R
[51] Int. Cl............................................. G21c 17/10
[58] Field of Search................... 176/19, 19 L, 19 R

[56] References Cited
UNITED STATES PATENTS
3,025,226  3/1962  Martin et al. .................... 176/19 R FOREIGN PATENTS OR APPLICATIONS
1,079,234  4/1960  Germany........................... 176/19 R Primary Examiner—Reuben Epstein
Attorney—Spencer & Kaye

[57] ABSTRACT

A device having a housing on which are attached a plurality of measuring canals arranged in a circle. Within the housing is a disc having a bore. The disc is mounted rotatably such that its bore may sweep over the various measuring canals arranged in the circle. The disc may be stopped for the registering of its bore with any one of the canals, whereby a selecting tube connected to the bore of the disc is placed in communication with a particular measuring canal for the introduction into the measuring canal of a sensor for taking measurements. The gap between disc and housing is sealed around the bore and measuring canals.

7 Claims, 2 Drawing Figures

Patented Oct. 16, 1973

3,766,005

Inventor:
Wilhelm Erkens

BY Spencer & Kaye
ATTORNEYS

DEVICE FOR THE MECHANICAL SELECTION OF REACTOR MEASURING CANALS

BACKGROUND OF THE INVENTION

The present invention relates to a device for the mechanical selection of nuclear reactor measuring canals for the introduction into, and withdrawal from, such canals of measuring sensors.

In order to be able to determine the different physical conditions of a nuclear reactor, for example to measure the neutron flux (the number of neutrons passing through a square centimeter of area per second) in a reactor core, measuring sensors are moved into the reactor core through measuring canals. Such measuring canals are formed by tubes.

For several measuring canals, for example fifteen such canals, it may be convenient to use only a single measuring sensor, which is selectively introduced into the canals as desired. In order in such a situation to be able to select the measuring canals mechanically in simple fashion, open ends of the measuring canals may be brought together and arranged on the circumference of a circle. Using a bent tube, called a selecting tube, mounted rotatably about the center of the circumference of this circle, one end of the selecting tube can be brought selectively into registration with the open ends of the measuring canals. This process is called selection. Upon a registering, a measuring sensor can be moved through the selecting tube and into the particular canal in registration with the selecting tube.

Since it cannot be completely assured that the sealing of a measuring canal tube at locations within a reactor will remain perfect, it is necessary to provide for the closing-off of the measuring canal tubes and/or for the indicating of leakages. Should sealing be lost, it is possible that coolant or moderator might get into the measuring canals. It is known to provide electrically controlled valves in the separate measuring canals. These valves are connected to transducers emitting electrical signals as a function of humidity, etc., so that the canals are automatically closed upon the detection of leakages.

SUMMARY OF THE INVENTION

An object of the present invention, therefore, is to provide a device for the mechanical section of measuring canals, of the type utilizing a selecting tube as above described, of simple construction, easy to build, with a compact structure, and not requiring auxiliary control members such as the above-mentioned electrically controlled valves.

This as well as other objects which will become apparent in the discussion that follows are achieved, according to the present invention, by a device having a housing with an end containing bores for receiving measuring canal ends from a reactor, in which housing is a rotatably mounted disc having a bore situated off of its center of rotation for receiving a selecting tube. The disc is pressed toward the housing end and there are interposed, between the disc and such end, seals for sealing the gap between the disc and housing end around the bores in such end.

If the device of the invention is used with a water-cooled reactor, it is advantageous to mount an automobile spark plug in the housing beneath and in communication with each measuring canal, so that a leakage of water into a canal can be shown as a short circuiting of a plug. This modification has the advantage of its ease of execution with very simple and easily obtainable means.

If a reactor with another coolant or moderator is being operated, the spark plugs can be replaced with sensors appropriate for detecting leakages of these other materials. For example, in a helium-gas-cooled reactor, it would be appropriate to use a helium sniffer or the like.

DESCRIPTION OF THE PREFERRED EMBODIMENTS

Figures 1, 2:
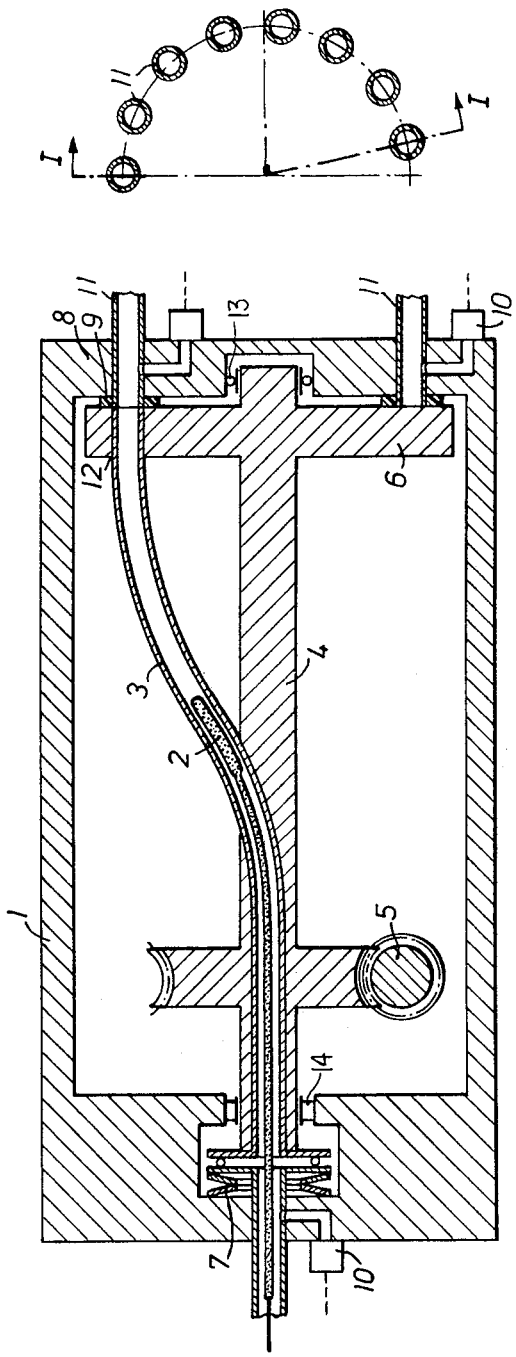
FIG. 1 is an elevational cross section containing the axis of a device according to the invention.
FIG. 2 is a cross sectional view of measuring canals extending from the top of a nuclear reactor.

Referring firstly to FIG. 2, the viewer is looking downwards and sees half of the tubes of fifteen measuring canals 11 arranged regularly in a set on a circle. These measuring canals extend downwards into various locations in a nuclear reactor (not shown) where it is desired to take measurements.

Referring now to FIG. 1, which is related to FIG. 2 as shown by the section line I—I, a device according to the invention for mechanically selecting measuring canals of a reactor includes a housing 1, whose lower end 8 is provided with fifteen bores arranged regularly on the circle on which the measuring canals are arranged in FIG. 2. The axes of the bores in end 8 extend perpendicularly to the plane of end 8. The fifteen measuring canals of FIG. 2 extend with open ends into the bores of end 8 and the outer surfaces of the measuring canals are secured and sealed to the walls of the bores. Only two of measuring canals 11 are visible in FIG. 1.

Within housing 1, disc 6 is mounted fixedly on a shaft 4 with one side of the disc facing end 8. Disc 6 can rotate about its axis relative to the housing due to the provision of bearings 13 and 14 supporting shaft 4. Disc 6 has a bore 12 situated radially outwards from the disc axis and extending parallel to the disc axis. The location of the disc axis and the radial placement of bore 12 is such that, when disc 6 rotates, the center of bore 12 traces out the circle of the bores and canal open ends in end 8. The axis of bore 12 is parallel to the axes of the bores in end 8. Selecting tube 3 passes through a bore on the axis of shaft 4 on the side of the disc opposite to that facing end 8 and then bends out of shaft 4 and ends with an open end secured and sealed in bore 12. A measuring sensor 2, for example a neutron flux measuring sensor, is freely situated within tube 2, so that it may be pushed back and forth and, as desired, moved into a measuring canal 11 in register with bore 12.

The disc 6 is biased, by force arising from Belleville spring set 7 and transmitted through shaft 4, toward housing end 8. The gap between disc 6 and housing end 8 is sealed at the locations of the bores in end 8 by O-ring seals 9 secured to end 8 and surrounding the bores in end 8. When bore 12 registers with any one of the bores in end 8, bore 12 and the registered bore in end 8 are both sealed from the gap by the corresponding seal 9 surrounding the registered bore in end 8. It may be advantageous to place the O-ring seals in grooves in end 8 concentric to its bores; such grooves would be sufficiently shallow that the O-ring seals would protrude into contact with disc 6.

Seals 9 effect, in a very simple manner, the complete sealing off of non-selected measuring canals. In FIG. 1, the lower measuring canal in the Figure is the non-selected canal, the upper canal in the Figure being selected in that tube 3 is in register with it. Naturally, it is possible to provide the seals 9 differently; for instance, seals 9 might be secured to disc 6 in an identical distribution to that of the bores in end 8. It is possible to effect the complete sealing off of all measuring canals, when seals 9 are secured to end 8, by moving bore 12 to a point midway between two adjoining bores in end 8.

Shaft 4 is driven with the help of worm and worm gear combination 5. The selecting tube may thus be brought by remote control, using an electric motor to actuate combination 5, to any of the various positions in which bore 12 will register with a bore in end 8. That is, any measuring canal can be selected, with the seals 9 providing that only that measuring canal into which sensor 2 is to be inserted is opened.

Beneath each of the points of registry and in communication with the measuring canals, there are provided separate spark plugs 10. These plugs are screwed pressure-tightly into end 8 at the locations shown in FIG. 1. The transverse bores placing the spark gaps of the plugs in communication with the individual measuring canals are shown. Should reactor water get into the measuring canals, the electrodes at the spark gaps of the plugs are short circuited, and this may be sensed externally by electrical means.

On the upper side of housing 1, thus on its left side as shown in FIG. 1, another spark plug 10 is provided in the same manner as are the spark plugs on the lower side of the housing. This spark plug serves for sensing larger leakages, which may occur during introduction of sensor 2 into a selected measuring canal. For such leakages, a safety valve must be actuated to prevent large quantities of reactor coolant from escaping.

As may be recognized, the selecting device of the present invention is very simple in construction, requires little mechanical drive equipment, etc., allows compact arrangement in one unit, requires no auxiliary control members, and moreover permits a significant saving in costs as compared with previous arrangements.

It will be understood that the above description of the present invention is susceptible to various modifications, changes and adaptations, and the same are intended to be comprehended within the meaning and range of equivalents of the appended claims.

I claim:

1. In a reactor having a plurality of measuring canals arranged within it for receiving a sensor for the taking of measurements, open ends of the measuring canals being arranged on the circumference of a circle, a device comprising, in combination: a housing having an end containing bores situated with their centers on said circle, in which bores said canal ends are secured; a disc having a bore; means for mounting said disc rotatably about an axis within said housing such that one side of said disc faces and is spaced from said housing end and the center of the bore in said disc lies always on said circle; a selecting tube secured in the bore of said disc; means for biasing said disc toward said housing end; and means in the space between said one side of said disc and said housing end for sealing, under the influence of said biasing means, the gap between said disc and said housing end around the bores in said housing end and around that bore in said housing end registering with the bore in said disc.

2. A device as claimed in claim 1, further comprising spark plug means for indicating the presence of water in said measuring canals.

3. A device as claimed in claim 1, wherein said sealing means are O-rings secured to said housing end and situated concentrically around the bores in said housing end.

4. A device as claimed in claim 1, said biasing means being a spring set mounted in said housing on the side of said disc opposite to its side facing said housing end.

5. A device as claimed in claim 1, said mounting means including a shaft on which said disc is fixedly mounted and bearing means permitting the rotation of said shaft about said axis, said selecting tube passing through a bore on the rotational axis of said shaft on the side of said disc opposite to that facing said housing end and bending out of said shaft and into the bore of said disc.

6. A device as claimed in claim 5, further comprising a worm and worm gear combination means within said housing for driving said shaft.

7. A device as claimed in claim 1, further comprising spark plug means on the side of said disc opposite to that facing said housing for indicating the presence of water in said selecting tube.

* * * * *